(12) United States Patent
Andrew et al.

(10) Patent No.: US 7,369,850 B2
(45) Date of Patent: May 6, 2008

(54) CONNECTIVITY NOTIFICATION DISPLAYING PATH TO CONNECTION

(75) Inventors: Felix G. Andrew, Seattle, WA (US); Shawn Brown, Redmond, WA (US); Justin Maguire, Seattle, WA (US); Chad Whitney, Seattle, WA (US); Zeke Koch, Seattle, WA (US); Ray Sun, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 414 days.

(21) Appl. No.: 10/292,613

(22) Filed: Nov. 12, 2002

(65) Prior Publication Data

US 2004/0204133 A1 Oct. 14, 2004

(51) Int. Cl.
*H04Q 7/20* (2006.01)
(52) U.S. Cl. ............... 455/435.1; 455/407; 455/552.1; 455/435.2; 709/217; 709/218
(58) Field of Classification Search ............. 455/435.1, 455/435.2, 407, 552.1, 553.1; 709/217, 218, 709/219
See application file for complete search history.

(56) References Cited

U.S. PATENT DOCUMENTS 5,613,204 A * 3/1997 Haberman et al. ....... 455/432.3
5,903,832 A * 5/1999 Seppanen et al. ........ 455/435.3
6,138,002 A * 10/2000 Alperovich et al. ........ 455/407
6,359,892 B1 * 3/2002 Szlam ........................ 370/401
6,603,755 B1 * 8/2003 Parker ........................ 370/342
6,889,049 B2 * 5/2005 Khawand ................. 455/452.1
2002/0059434 A1 5/2002 Karaoguz et al.
2002/0087674 A1 7/2002 Guilford et al.

* cited by examiner

*Primary Examiner*—Nay Maung
*Assistant Examiner*—Richard Chan
(74) *Attorney, Agent, or Firm*—Workman Nydegger

(57) ABSTRACT

A system and method in a connectivity user interface of a mobile device that enables a user to inspect and select a connection from among available network connections and methods of connecting. If the user alternatively wants a connection to be automatically selected by the device, the connectivity user interface allows the user to verify the connection that will be made when required. An easily accessible connectivity dialog displays configured connections, and connection data. Before a connection is established, the connection data may describe a type of connection, such as the telephone number for a dial-up connection. After a connection is established, the connection data may describe the connection's status, such as the amount of time the connection has been in use. A link in the connectivity user interface enables the user to efficiently configure or reconfigure a connection.

32 Claims, 8 Drawing Sheets

CONNECTIVITY NOTIFICATION DISPLAYING PATH TO CONNECTION

FIELD OF THE INVENTION

The invention relates generally to mobile computing devices, and more particularly to connecting mobile computing devices to external information sources such as networks.

BACKGROUND OF THE INVENTION

Small, mobile computing devices such as personal desktop assistants, contemporary mobile telephones, hand-held and pocket-sized computers, tablet personal computers and the like, are becoming important and popular user tools. In general, they have become small enough to be extremely convenient, while consuming less battery power, and at the same time have become capable of running more powerful applications.

Recent developments have resulted in such devices being able to connect to networks, including the Internet. For example, typical mobile computing devices such as pocket-sized personal computers can now place telephone calls, as well as connect to networks over technologies such as Wireless Ethernet (also known as 802.11b or Wi-Fi), and Bluetooth™ wireless technology. Likewise, mobile telephones such as those running Microsoft® Smartphone software allow users to make conventional mobile telephone calls and also access the Internet, as well as send and receive e-mails and files, store contacts, maintain appointments and do many other things contemporary computers can now do.

With sophisticated devices like pocket-sized personal computers, there may be more than one way to connect to a remote device. For example, with mobile devices, a user can dial up a network, or can use GPRS (General Packet Radio Service). GPRS is emerging as a technology via which networks can offer high-capacity, 'always-on' Internet-based content and packet-based data services. Cost is a factor to many users, and roaming impacts the cost of GPRS and CSD (Circuit Switched Data) calls. In sum, for various reasons, such as cost, speed, and so on, many users want to select from among these multiple types of connections.

However, with mobile devices configured for multiple types of connections, users do not know which connection will be used. In other words, a connection is selected for the user, without the user's input. Thus, when the user configures the device to connect, there currently is no way for the user to know which connection the device will choose to connect, e.g., when called upon by an application that needs a network connection. At present, the user only finds out in the event the device fails to establish a connection.

Improvements in convenience that increase the usability of mobile devices are needed, however heretofore there has been no convenient solution to determine and/or select the current network connection on contemporary mobile devices. Further, since these types of devices are inherently mobile, the user may frequently change area codes, and thus have to review and possibly change the current dialup settings. At present, the user has to be fairly knowledgeable to navigate to a connection manager user interface to review the current settings and/or change them, which requires that the user enter through a Start menu, control panel user interface. In sum, the present mechanisms for connecting mobile devices to networks are generally inconvenient, confusing, difficult and/or not very intuitive to many users.

SUMMARY OF THE INVENTION

Briefly, the present invention provides a system and method incorporated into a connectivity user interface (notification) that can be displayed as needed to view the network connections available and the methods of connecting via those connections. The connectivity user interface, such as in the form of a drop-down connectivity dialog, provides a mechanism via which the user can determine which connection will be used to connect, along with connection data such as the phone number to be dialed, modem, Wi-Fi card, Proxy, VPN and similar information, as applicable.

Prior to a connection being made, the user has the ability to interface with the connectivity dialog to inspect the connections and decide which connection is desired. To select and connect, the user actuates a link displayed in the connectivity user interface for that connection. After the device is connected, the user is able to use the connectivity user interface to disconnect, such as via a "Disconnect" button or link which is provided when a connection exists, to provide the user with a straightforward disconnection mechanism.

The connectivity user interface thus provides an alternative method to connect to networks, for users that prefer a particular connection at a given time and/or like to connect before starting an application. In this manner, the user can essentially override the connection decision that the device would otherwise automatically make when a connection was needed. If however the user prefers the automatic connection, or simply does not understand how to select and connect beforehand, a selection will be automatically made as before, based on the nonexistence of a connection when one is needed.

In one implementation, to display the connectivity user interface, the user taps or otherwise actuates an icon, such as one displayed in the navigation bar or other suitable location on the device display. One preferred icon is the icon that shows connectivity state and/or signal strength on a device with an integrated radio, e.g., in the shape of an antenna with an accompanying signal strength meter. When this icon is tapped, the connectivity user interface appears, such as in the form of a pop-up bubble.

When the user configures the device to connect via a network, the connectivity user interface shows the method and path for the connection. For example, when a dialup modem is configured, the phone number will be shown to convey that that the dialed number is the path to the connection. Thus, via the connectivity notification user interface, the user can see what is going to be dialed, or how the user is otherwise going to connect (e.g., via a VPN) before they connect. Further, the connectivity notification user interface provides a direct link to a connection manager, where the user can change settings as needed, such as to quickly remedy a connectivity problem. When the device is in the connected state to a dial-up connection or VPN, the location that displayed the phone number (or VPN) shows a timer, which notifies the user that the connection is present and informs the user how much time has been spent in the connection.

In this manner, whenever the connectivity notification user interface is displayed, the user may conveniently perform connection-related tasks, such as turning the radio (phone) on or off, navigating directly to the connection manager, connecting (or disconnecting if connected) to a work network or the Internet, and possibly changing the dialing location. The user may also hide the connectivity notification user interface, such as without having performed a task.

Other advantages will become apparent from the following detailed description when taken in conjunction with the drawings, in which:

DETAILED DESCRIPTION

Exemplary Operating Environment

Figure 1:
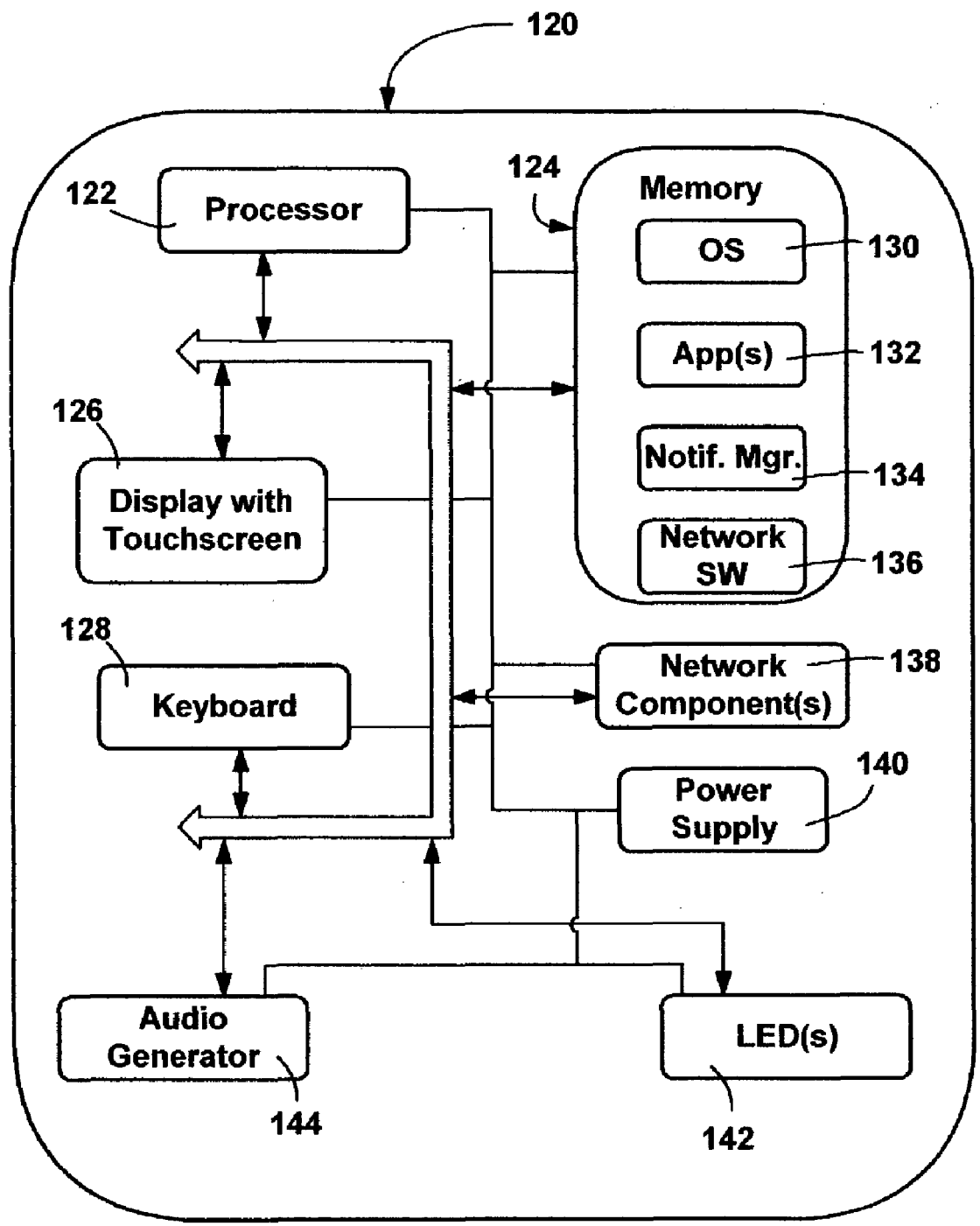
FIG. 1 is a block diagram generally representing a computer system into which the present invention may be incorporated.

FIG. 1 shows functional components of one such handheld computing device 120, including a processor 122, a memory 124, a display 126, and a keyboard 128 (which may be a physical or virtual keyboard). The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® XP operating system from Microsoft Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132. Also, as described below, the handheld personal computer 120 includes networking software 136 (e.g., hardware drivers and the like) and network components 138 (e.g., a radio and antenna) suitable for connecting the handheld personal computer 120 to a network, which may include making a telephone call.

The handheld personal computer 120 has a power supply 140, which is implemented as one or more batteries. The power supply 140 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 142 and an audio generator 144. These devices may be directly coupled to the power supply 140 so that when activated, they remain on for a duration dictated by a notification mechanism even though the handheld personal computer processor 122 and other components might shut down to conserve battery power. The LED 142 preferably remains on indefinitely until the user takes action. Note that contemporary versions of the audio generator 144 use too much power for today's handheld personal computer batteries, and so it is configured to turn off when the rest of the system does or at some finite duration after activation.

Connectivity Notification

Figure 2:
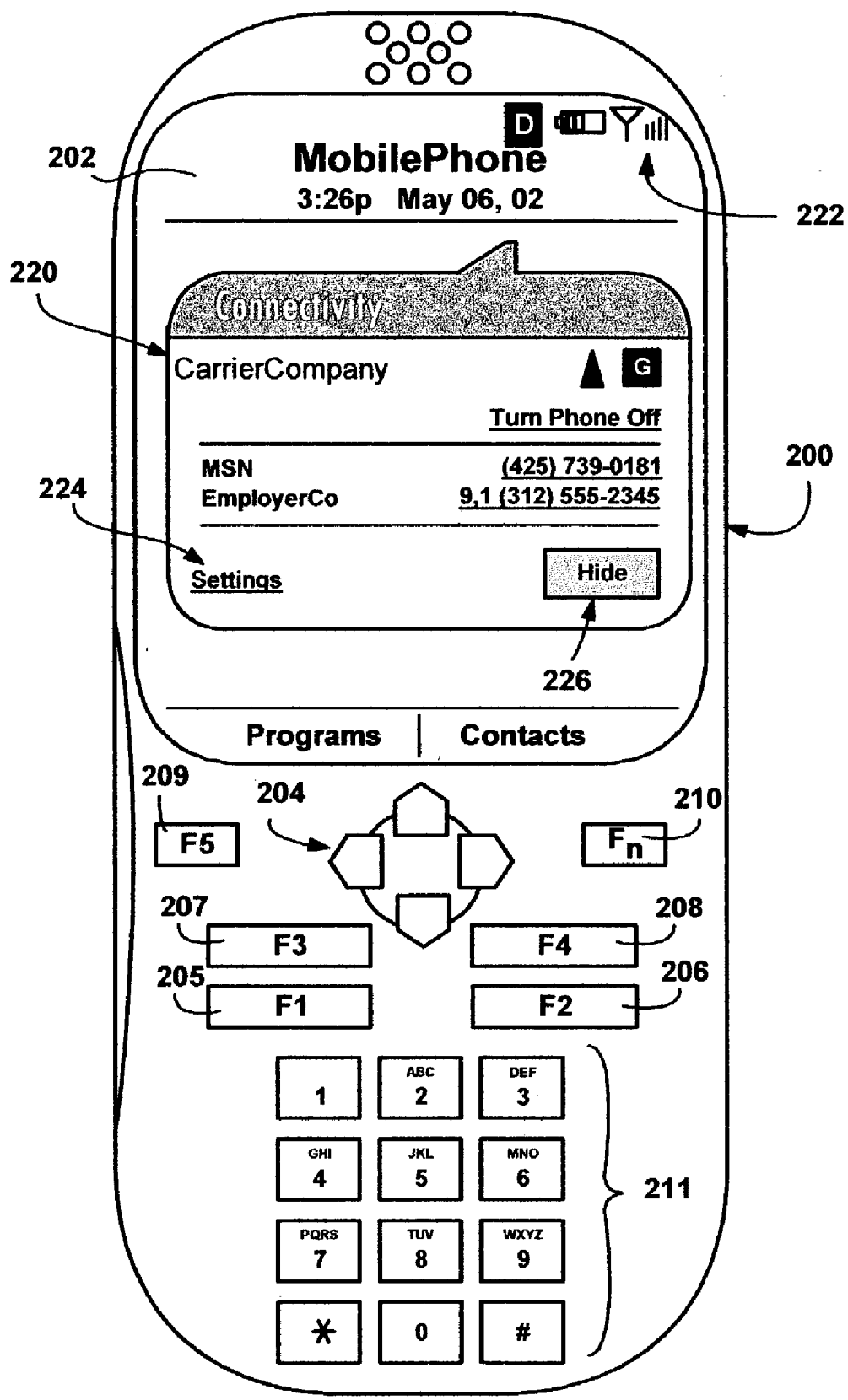
FIG. 2 is a simplified representation of a mobile telephone constructed in accordance with an aspect of the present invention.
Figure 3:
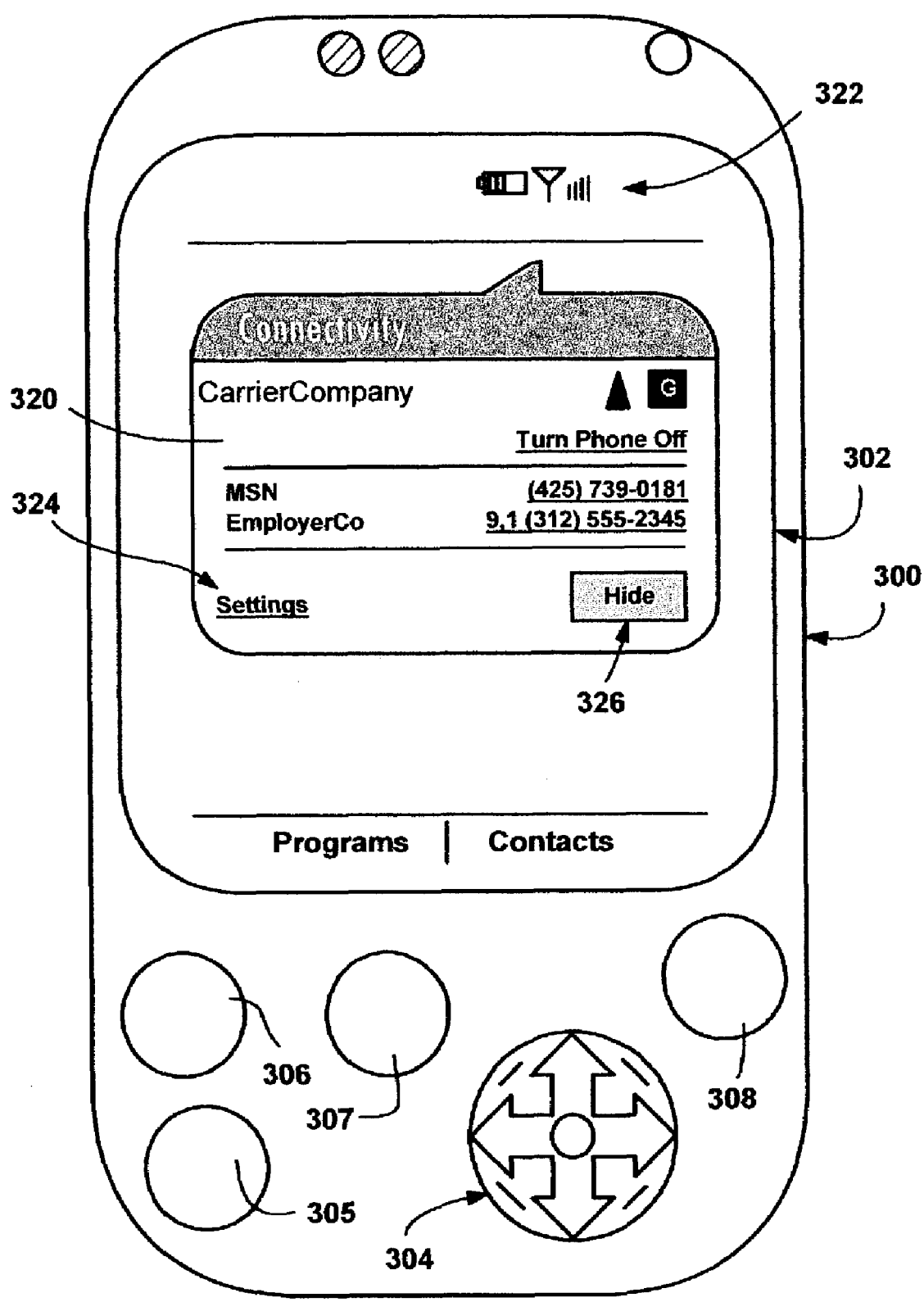
FIG. 3 is a simplified representation of a pocket-sized or handheld computing device constructed in accordance with an aspect of the present invention.

In general, the present invention is capable of being used on any mobile device having remote communications capability, such as the mobile telephone 200 of FIG. 2 or the handheld computing device 300 of FIG. 3. FIG. 2 represents an example mobile telephone 200, with a touch-sensitive display 202 arranged to interface with a user in accordance with the present invention. The mobile telephone 200 typically also includes some suitable number of hardware buttons (e.g., buttons 204–211) that receive user input to perform various functions. As described below, a connectivity dialog 220, shown in the form of a pop-up bubble, provides a user interface that facilitates working with network connections.

FIG. 3 is a representation of a handheld computing device 300 (such as the device 120 described with reference to FIG. 1) with a display 302. The device may also include some suitable number of hardware buttons, e.g., buttons 304–308. As with the mobile telephone 200 and as described below, a similar connectivity dialog 320, also shown in FIG. 3 in the form of a pop-up bubble, provides a user interface that facilitates working with network connections.

In general, the connectivity dialog 220 (FIG. 2) or 320 (FIG. 3) appears when the user taps on the displayed antenna/signal strength meter 222 or 322, or other suitable signal indicator or icon. Note that although a connectivity bubble is shown in the example, the present invention can utilize virtually any notification-like user interface, such as a dialog or message box. Further note that other ways of requesting the connectivity dialog (e.g., via a hardware button) are feasible.

Figure 4:
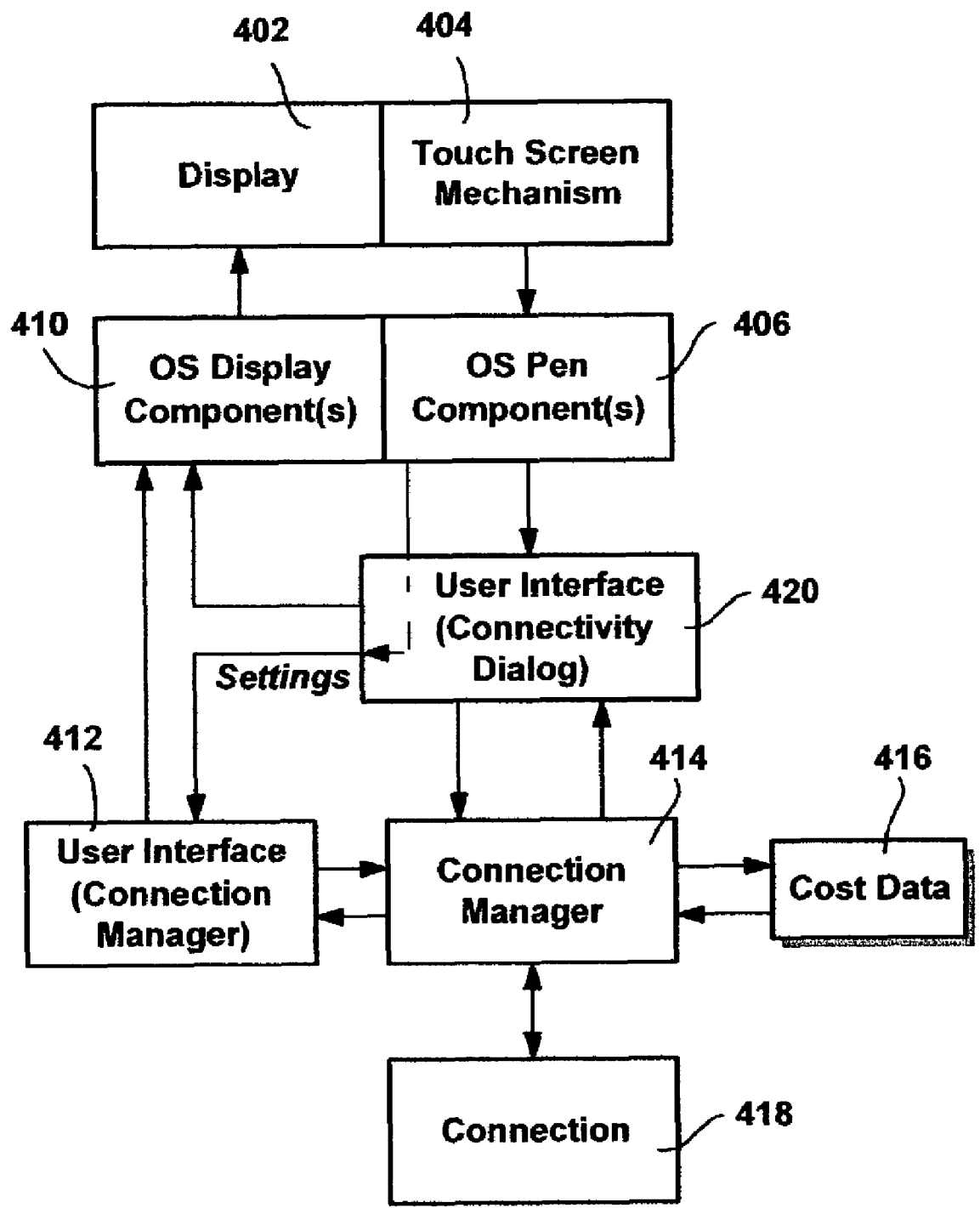
FIG. 4 is a block diagram generally representing components for implementing various aspects of the present invention.

As represented in FIG. 4, on either device, when the display 402 is contacted, (which includes devices in which sufficiently close proximity to the screen is sensed even if not actually contacted), a touch screen mechanism 404 provides coordinates in the form of pen events to an operating system pen component 406. In turn, the operating system pen component (or components) 406 determine the underlying meaning of the location that has been contacted, that is, what action to take based on what icon, window, and so on presently corresponds to the contacted location. In this manner, the user is able to contact the displayed antenna/signal strength meter (e.g., 322 of FIG. 3) to obtain the connectivity dialog 420, and interface with that dialog 420, as displayed via operating system display components 410.

By way of example, when the connectivity dialog 220 (FIG. 2) or 320 (FIG. 3) is displayed, the user is able to hit a "Settings" link (224 in FIG. 2, or 324 in FIG. 3) which takes the user directly to a connection manager user interface display 412 (FIG. 4). Previously, the connection manager user interface display 412 was not so conveniently accessible, but for example was instead only accessible via a main control panel user interface (not shown), which in turn is typically invoked via a Start menu).

With the present invention, because the user can see what number is going to be dialed before dialing, the user can recognize that there may be a potential or actual problem, e.g., the user has to change a dialing setting in order to connect. The settings link 224 or 324 provides the user with the ability to quickly navigate to the connection manager user interface display 412, where the dialing settings may be adjusted as needed. Note that in an alternative implementation, (not shown), each displayed connection may have its own settings link.

The user is also able to hide the connectivity dialog 420 via a hide button 226 (FIG. 2) or 326 (FIG. 3) displayed in the respective connectivity dialog, 220 or 320.

Figure 5:
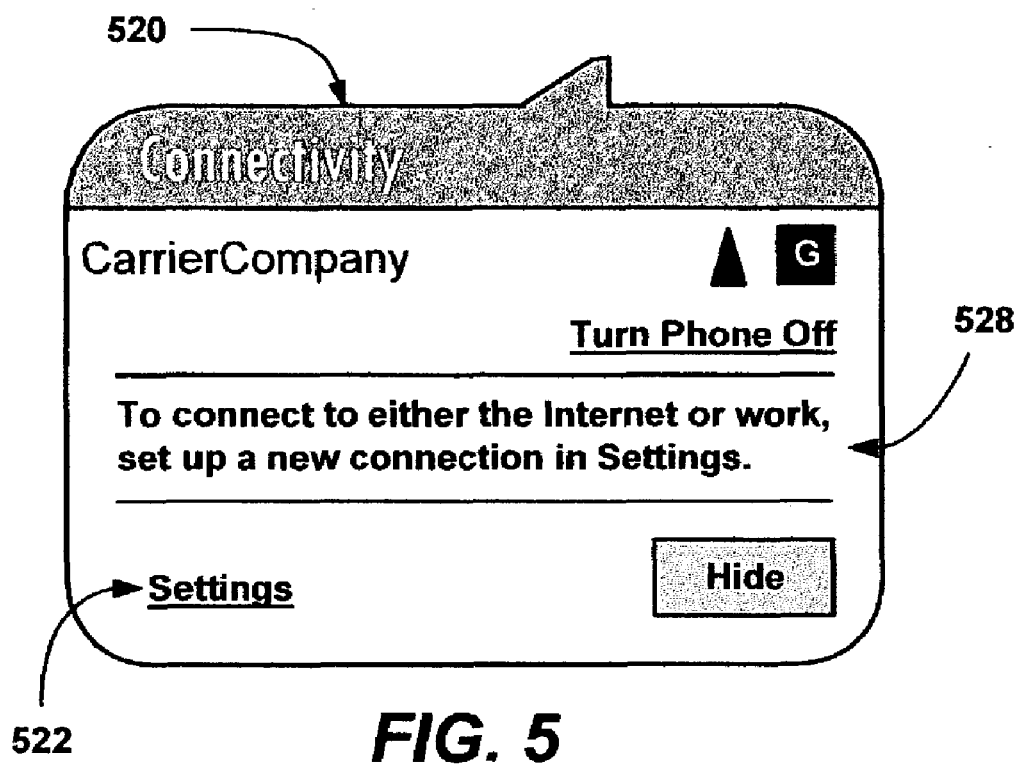
FIGS. 5 and 6 are representations of an example connectivity user interface in various states that facilitate connection-related tasks in accordance with one aspect of the present invention.

As represented in FIG. 5, when the user has no networks configured, a initial state of the connectivity dialog 520 provides some helpful text 528 to guide the user to the Settings link 524, which when tapped takes the user to the connection manager user interface display 412 (FIG. 4). In an alternative implementation, (not shown), when no connections are configured, one or more default network names (e.g., "My ISP" or "My Work") may be displayed, along with the settings link, whereby the user can configure those connections. From the connection manager user interface 412, the user is able to configure a network connection via a connection manager software program 414. Note that the connectivity dialog 420 is connected to the connection manager 414 and operating system, and thus can obtain the connection data, including whether any connections have been configured, whether configured connections are currently connected or disconnected, and so forth. In one implementation, the connectivity dialog 420 and the connection manager 414 may comprise operating system components.

Figure 6:
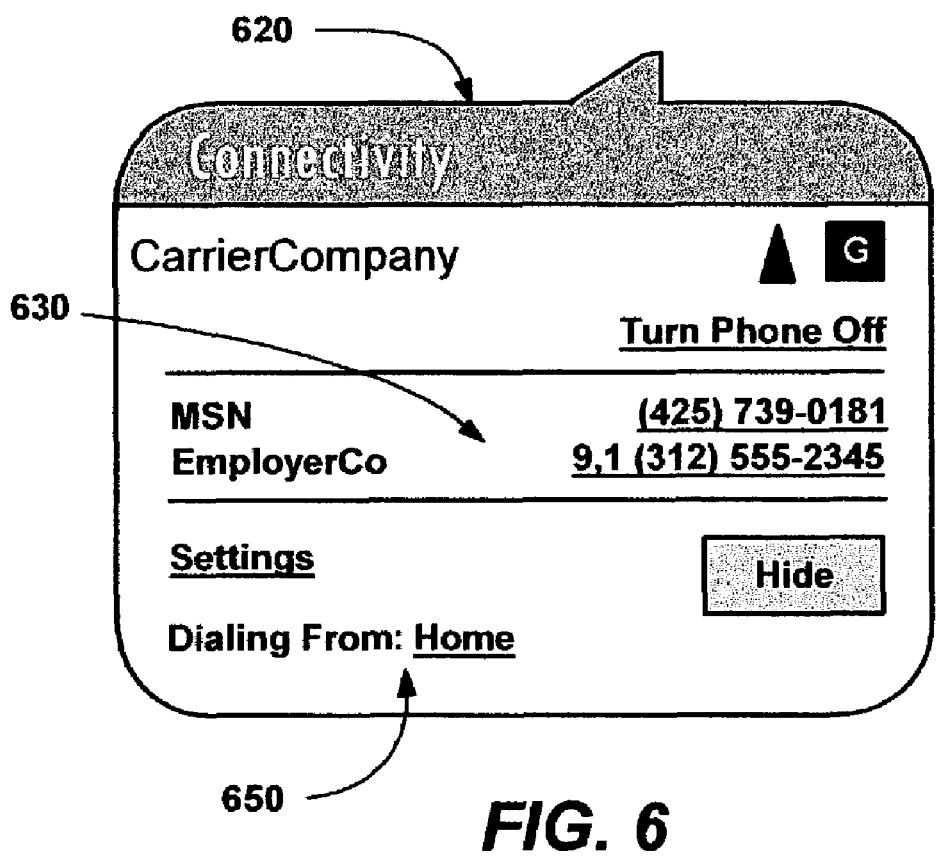

FIG. 6 represents the state of the connectivity dialog 620 when displayed after the user has configured at least one network, wherein the connectivity dialog 620 shows the connection or connections in an area 630 of the dialog 620, along with method and path data that inform the user of the type of connection. The displayed connection information may include phone number, modem, Wi-Fi card, Proxy, VPN, and so forth, as applicable to indicate an appropriate method of connection, e.g., ISP or work dialup, network card, virtual Private Network (VPN), GPRS connection, and the like. Note that in some implementations, some inherent information (e.g., proxy) may not be shown, and instead be handled by the connection manager in a manner that is transparent to the user.

Note that if the user has named the network connection, the actual name is used instead of a default name, (such as "My ISP" or "My Work"). Further, note that in one implementation, when a phone number is shown, that phone number will be displayed exactly as dialed, e.g., if a user's dialing rules instruct the device not to dial an area code when already in that area code, the area code will not be displayed, nor dialed if selected, when in that area code. As represented in FIG. 6, in one implementation, "Dialing From" text with a link 650 to a user-defined location is displayed, whereby a user informs the system of a dialing location, and thereby has appropriate dialing rules used, e.g., to remove the destination's area code when it is the same as the specified user's location, as described above. The presence or absence of this text/link may be made user configurable, so that users that do not frequently change locations can switch this off unless and until needed.

In accordance with one aspect of the present invention, via the connectivity dialog (e.g., 620) that shows a configured network connection, the user is able to manually establish a connection, instead of having one automatically selected for the user when one is needed. The established connection is represented in FIG. 4 by the box labeled 418. To establish a connection, the user taps on the displayed connection (e.g., one of the two displayed in area 630 of FIG. 6) that is desired. In an alternative implementation, a "Connect" button may be provided, such as if the user has only one connection, or the tapping only highlights the selection and requires a "Connect" confirmation.

Figure 7:
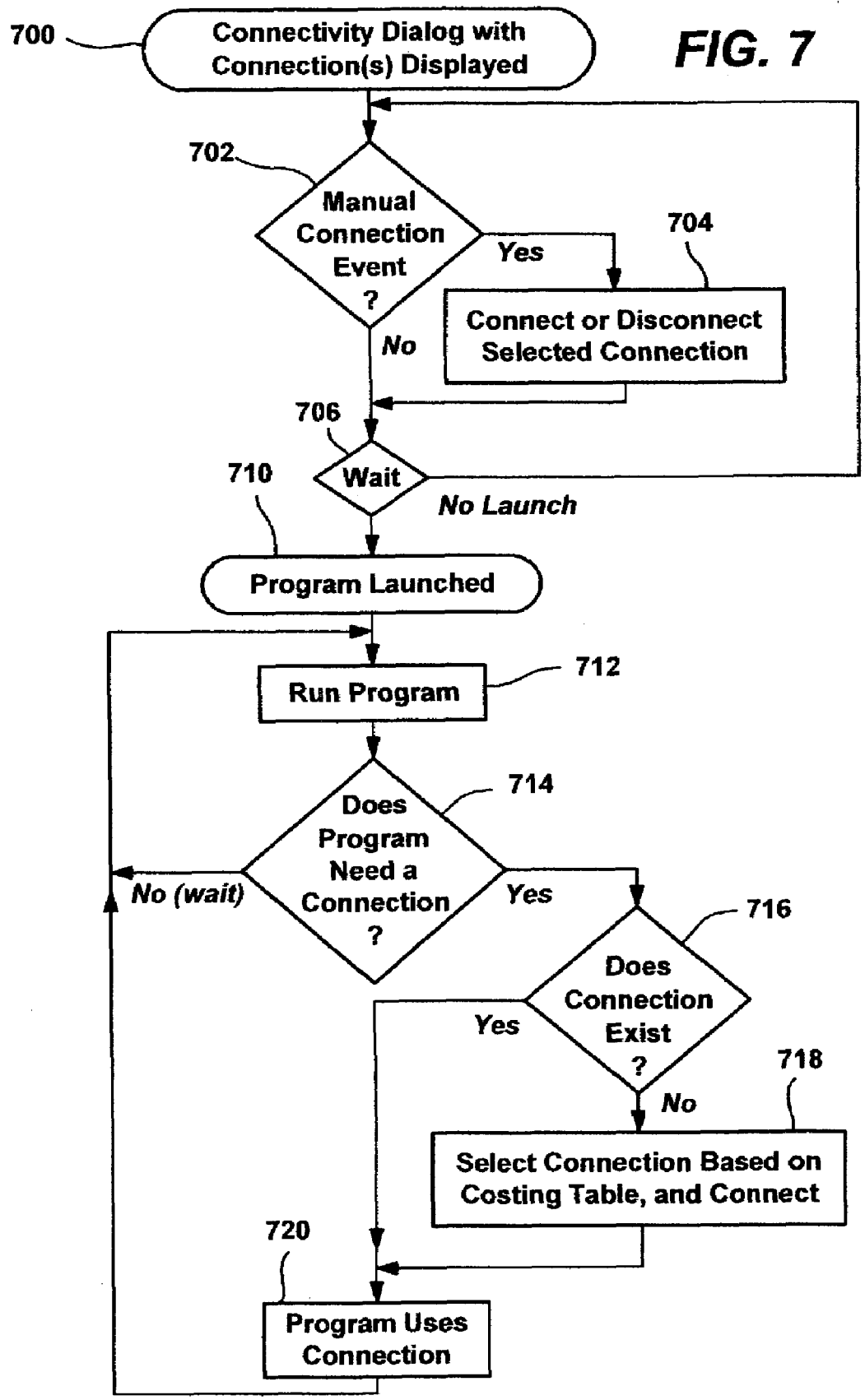
FIG. 7 is a flow diagram generally representing an example scenario by which a user can select a connection or have a connection automatically selected therefor in accordance with an aspect of the present invention.

Note that prior systems automatically selected a connection for a user, such as based on cost data 416 maintained at the connection manager 414. The present invention still allows for such automatic selection, however this is now dependent on the connection state when one is needed. FIG. 7 generally represents how the manual versus automatic selection works in an example scenario.

FIG. 7 represents general logic in an example scenario, in which a user may decide to manually establish a connection, or may let the connection manager automatically select a connection. To this end, step 700 represents a state in which the connectivity dialog is being displayed, after at least one connection has already been configured.

Steps 702–706 represent waiting for a user to manually select a connection, by tapping on a displayed connection link as detected by step 702. If tapped, the connection is established, as represented by step 704. As described below, an existing connection may also be disconnected by tapping a disconnect button, which steps 702 and 704 also represent. In any event, step 706 represents returning to step 702, essentially waiting for some connection-related event to occur. Note that steps 702–706 are represented as a loop for purposes of explanation herein, but as can be appreciated are likely to be event driven rather than implemented in a loop. Further, note that many events other than a manual connection event may be handled, such as the when the "Hide" or "Settings" button/link is tapped, however the handling of these events are not shown for purposes of simplicity.

Step 710 represents the launching of a program, which may occur at any time, and is essentially unrelated to steps 700–706. However the present example explains the launching of a program with respect to the connectivity dialog, which may be automatically hidden when the program is launched.

Step 712 represents the running of the launched program, while step 714 represents a test as to whether the program needs a connection. For example, the program may host a browser which requires an Internet connection, the program may be an e-mail program which requires a connection to send or retrieve message data, and so forth. Again, steps 712 and 714 are represented as a loop for purposes of explanation, however as can be appreciated, the program will typically make a function call or generate an event when it needs a connection.

If, as represented by step 714, the program needs a connection, step 716 is executed to determine whether a connection exists. For example, as described above, the user may have manually established a connection at steps 702 and 704, and that connection is still alive. In keeping with the present invention, if a connection exists, the program uses the existing connection. If not, step 718 is executed, where a connection is automatically selected for the user, such as based on cost factors, which the program then uses at step 720.

Note that formerly existing connections may become disconnected, e.g., be lost due to poor reception or manually turned off, and thus FIG. 7 represents step 716 being re-executed whenever an application needs a connection. As can be readily appreciated however, when an existing connection is disconnected, the user may not want an automatic selection made. For example, a user may manually disconnect a connection when boarding an airplane, or may prefer to wait until a particular connection that was lost (e.g., due to lost reception) again becomes available. Thus, step 716 may include a prompt or other warning before automatically reconnecting, and may cause the connectivity dialog to reappear.

As can be readily appreciated, the type of connection may be inherent to an extent, and handled by the connection manager 414 (FIG. 4). For example, an e-mail program may need to connect (e.g., via remote access server, or RAS) to the corporate network; if the existing connection is to the Internet via an ISP connection, the connection manager 414 may use that connection to set up a virtual private network (VPN) to the corporate network. Alternatively, if already connected to the corporate network, and the program needs Internet access, the connection manager automatically attempts to provide Internet access via proxy through the corporate network. In one implementation, this is not shown to avoid confusing the user.

In sum, if the user manually makes a connection via the connectivity dialog 408, the user-selected connection will be used by a program launched thereafter. If instead the user launches a program without having any established connection, and the program needs a connection, the connection will automatically be made for the program.

Figure 8:
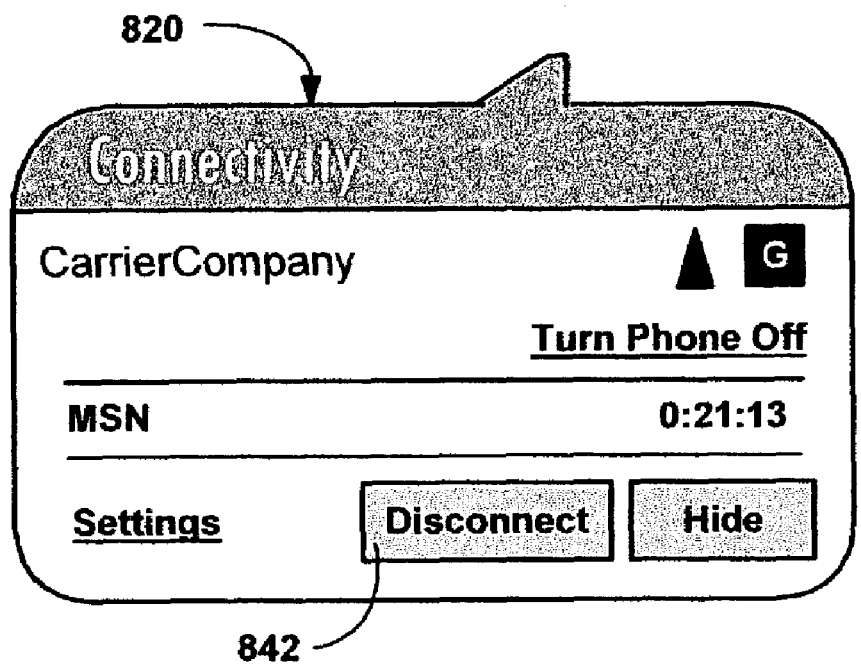
FIGS. 8–11 are representations of the example connectivity user interface in various other states that facilitate connection-related tasks in accordance with one aspect of the present invention.
Figure 9:
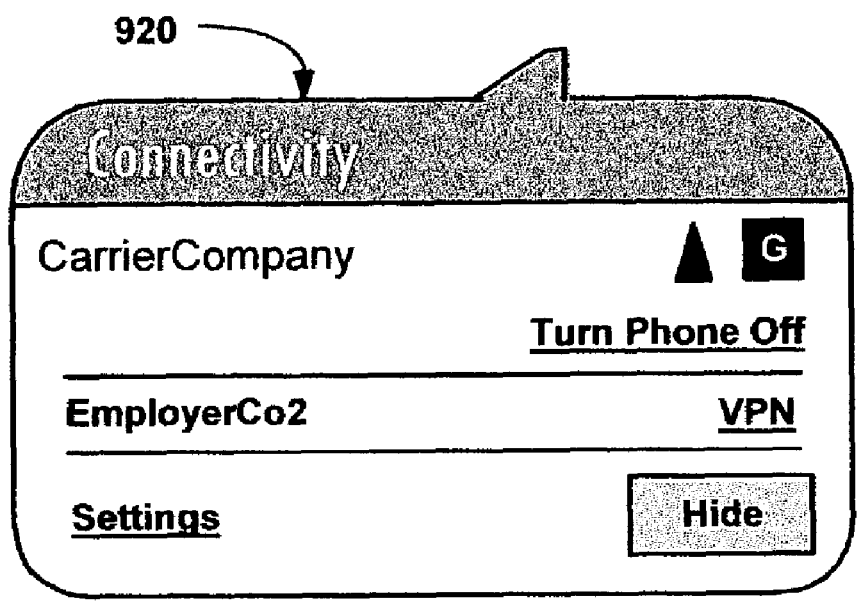
Figure 10:
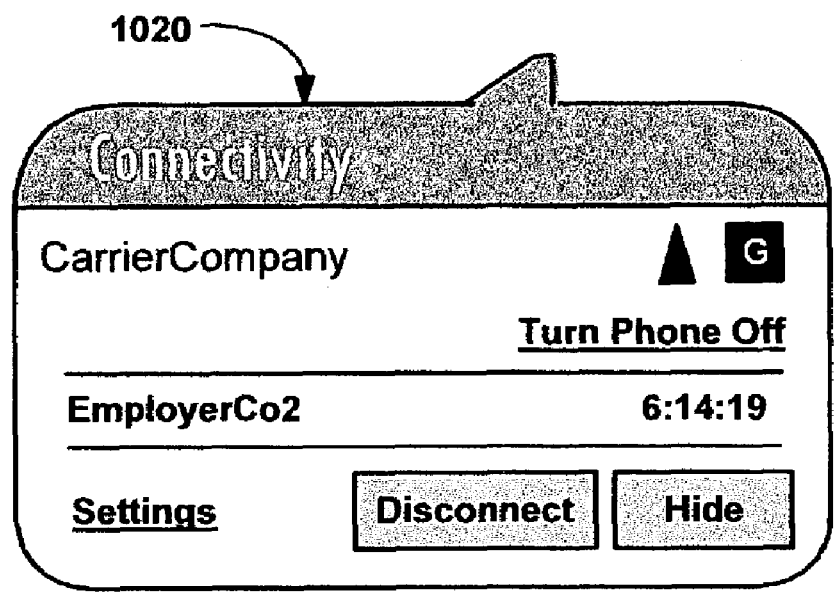

In addition to facilitating user-selected connections, the present invention also helps the user with connectivity in other ways, via the connectivity dialog. For example, as represented in FIG. 8, when a connection is active and the connectivity dialog is popped-up, the connectivity dialog 820 shows the connection time elapsed (e.g., hh:mm:ss, refreshed every second), and also provides a disconnect button 842. Note that the connection time is shown only for dial-up connections and VPNs, as generally represented in FIGS. 8–10, including GPRS (General Packet Radio Service), the internet packet network for GSM (Global System for Mobile communications) and 1×RTT (single carrier (1×) radio transmission technology), the internet packet network for CDMA (Code Division Multiple Access wireless phone transmission). In one implementation, the connectivity dialog does not show the connection time of a telephone call, because that is already displayed elsewhere.

Figure 11:
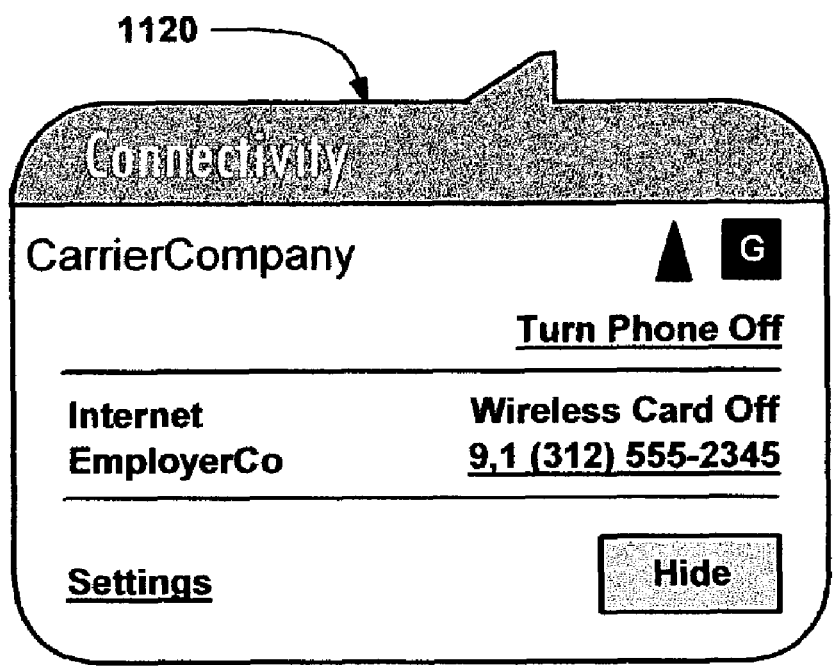

Network card connection times are preferably not shown, although it would be feasible to do so if desired, e.g., Wi-Fi might be shown for those users being charged by the minute. The state of the wireless card may be displayed, however, such as represented in the connectivity dialog 1120 of FIG. 11.

In one implementation, only those networks that are configured are displayed, not any networks by default, (e.g., "My ISP" or "My Work"). Thus, in the example of FIG. 8, the user has set up an ISP, but has not set up a work connection, and thus no default work connection is displayed. Similarly, in the alternative of FIG. 9, the user has set up a work connection, but not an ISP connection. In this implementation, networks that are not configured are not displayed by default, regardless of whether or not the user is connected. In an alternative implementation, when there are no paths to connect, the notification may instead display default networks (e.g., "My ISP" or "My Work") along with a Settings link whereby a connection can be created, and possibly other information such as a placeholder indicating "No Setting," to show the user there is no such network connection configured.

As can be seen from the foregoing detailed description, there is provided a method, system and user interface that enable a user to view connection data and select a connection therefrom. The user interface also facilitates the rapid configuration and/or changing of connection data. The method and system are convenient, understandable, straightforward and intuitive to use.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing device including multiple programs configured to use a network connection, a method comprising:
   providing a connectivity user interface, the connectivity user interface displaying information of at least one configured network connection and allowing user inspection of the at least one configured network connection prior to connecting to the at least one configured network connection, the information including a connection identity and connection data indicative of a type of connection for that identity;
   prior to launching a program, receiving user input directed to selecting a network connection displayed on the connectivity user interface, and selecting that connection as a selected connection, wherein the selected connection is to be used by subsequently launched programs on the computing device; and
   connecting to a network corresponding to the selected connection in response to the user input, regardless of previously established program-connection relationships that specify which connection would automatically be used with a particular program.

2. The method of claim 1 further comprising, providing an icon which when actuated provides the connectivity user interface.

3. The method of claim 1 wherein the connection data indicates the connection identity by displaying a user given text name corresponding to that connection.

4. The method of claim 1 wherein the connection data indicates the type of connection for a dial-up connection by displaying data including a telephone number corresponding to that connection.

5. The method of claim 1 wherein receiving user input comprises, receiving the user input corresponding to a location where the information of the selected connection is displayed.

6. The method of claim 1 further comprising, providing a disconnect mechanism to disconnect from the network.

7. The method of claim 6 further comprising, receiving user input corresponding to the disconnect mechanism, and in response, disconnecting from the network.

8. The method of claim 1 further comprising, providing a mechanism by which a user may navigate to a connection configuration user interface.

9. The method of claim 1 further comprising, providing a mechanism that a user may manipulate to indicate a location from which a displayed connection is to be dialed.

10. The method of claim 1 further comprising, providing a mechanism to hide the connectivity user interface.

11. The method of claim 1 further comprising, providing an indicator on the connectivity user interface that indicates when the device is connected to the network.

12. The method of claim 11 wherein the indicator comprises a time display that indicates an amount of time that the device has been connected to the network.

13. The method of claim 12 further comprising, updating the time display while the device is connected to the network.

14. A computer-readable medium having computer-executable instructions for performing the method of claim 1.

15. In a computing device including multiple programs configured to use a network connection, a method comprising:
providing a connectivity user interface, the connectivity user interface displaying each of a plurality of network connections that are not currently connected and allowing user inspection of each of the plurality of said network connections prior to connecting to any of the network connections, the connectivity user interface providing a mechanism for receiving user input directed to connecting to a user selected network connection;
prior to launching a program, receiving user input directed to selecting a network connection displayed on the connectivity user interface, and selecting that connection as a selected connection, wherein the selected connection will be used by any program launched on the computing device:
receiving a request from a program to use a network connection;
in response to the request, determining whether one of the network connections is one that was selected by the user and is currently connected; and
if the network connection is one that was selected by the user and is currently connected, using that user-selected currently connected connection to satisfy the request, regardless of previously established program-connection relationships that specify which connection would automatically be used with a particular program; and
if a network connection is not one that was selected by the user and is not currently connected, automatically selecting a selected connection from among the plurality of network connections that were not selected by the user and are not connected, connecting to the selected connection, and using the selected connection to satisfy the request.

16. The method of claim 15 wherein the user requests connection to one of the network connections, and further comprising, connecting to network connection requested by the user.

17. The method of claim 16 wherein the user launches the program after requesting connection to one of the network connections such that if the program requests to use a network connection, the network connection used will comprise the network connection requested by the user.

18. The method of claim 15 wherein the connectivity user interface displays information for each connection including a connection identity and connection data indicative of a type of connection for that identity.

19. The method of claim 15 wherein providing the connectivity user interface comprises, detecting a request to display the connectivity user interface, and in response to the request, obtaining information to display and displaying the connectivity user interface including at least some of the information.

20. A computer-readable medium having computer-executable instructions for performing the method of claim 15.

21. A method in a computer system including multiple programs configured to use a network connection, comprising:
receiving a user request to provide a connectivity user interface;
providing the connectivity user interface in response to the request, including obtaining connection information for at least one configured network connection and allowing user inspection of the at least one configured network connection prior to connecting to the at least one configured network connection, the information including a connection identity and corresponding connection data; and
displaying the connectivity user interface, including for each of the at least configured networks:
i) displaying a connection identity and connection data that indicates a type of connection for that connection identity, and
ii) providing an interface mechanism by which a user can request connection to the network corresponding to the connection identity, wherein a user can select a new connection that is to be used by subsequently launched regardless of previously established program-connection relationships that specify which connection would automatically be used with a particular program.

22. The method of claim 21 wherein a connection to a network exists, and further comprising, providing an interface mechanism in the connectivity user interface by which a user can request disconnection from the network.

23. The method of claim 21 wherein a connection to a network exists, and wherein displaying information indicating that the connection to the network exists comprises displaying an amount of time that the device has been connected to the network.

24. The method of claim 23 further comprising, updating the time display while the device is connected to the network.

25. The method of claim 21 wherein no connection to a network exists, and wherein the connection data indicates the type of connection for a dial-up connection by displaying data including a telephone number corresponding to that connection.

26. The method of claim 25 further comprising, providing a mechanism that a user may manipulate to indicate a location from which the telephone number is to be dialed.

27. The method of claim 21 further comprising, providing a mechanism in the connectivity user interface by which a user may navigate to a connection configuration user interface.

28. The method of claim 21 further comprising, providing a mechanism to bide the connectivity user interface.

29. A computer-readable medium having computer-executable instructions for performing the method of claim 1.

30. The method of claim 1, wherein providing the connectivity user interface further comprises the connectivity user interface allowing user modification of the at least one configured connection.

31. The method of claim 15, wherein providing the connectivity user interface further comprises the connectivity user interface allowing user modification of the at least one configured connection.

32. The method of claim 21, wherein providing the connectivity user interface further comprises allowing user modification of the at least one configured connection.

* * * * *